United States Patent
Turner et al.

(10) Patent No.: US 7,106,693 B1
(45) Date of Patent: Sep. 12, 2006

(54) METHOD AND APPARATUS FOR PACING THE FLOW OF INFORMATION SENT FROM A DEVICE

(75) Inventors: Jonathan S. Turner, St. Louis, MO (US); Jerome R. Cox, St. Louis, MO (US)

(73) Assignees: Cisco Technology, Inc., San Jose, CA (US); Washington University, St. Louis, MO (US)

( * ) Notice: Subject to any disclaimer, the term of this patent is extended or adjusted under 35 U.S.C. 154(b) by 971 days.

(21) Appl. No.: 09/705,395

(22) Filed: Nov. 2, 2000

(51) Int. Cl.
  *H04J 1/16* (2006.01)
  *H04L 12/28* (2006.01)
  *H04L 12/66* (2006.01)

(52) U.S. Cl. .................. 370/230; 370/235; 370/395.4; 370/412

(58) Field of Classification Search ........ 370/352–356, 370/395.4, 412–420, 230; 713/502
See application file for complete search history.

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,259 A | 12/1986 | Larson et al. | |
| 4,630,260 A | 12/1986 | Toy et al. | |
| 4,734,907 A | 3/1988 | Turner | |
| 4,745,593 A | 5/1988 | Stewart | |
| 4,829,227 A | 5/1989 | Turner | |
| 4,849,968 A | 7/1989 | Turner | |
| 4,893,304 A | 1/1990 | Giacopelli et al. | |
| 4,901,309 A | 2/1990 | Turner | |
| 5,027,342 A | 6/1991 | Boulton et al. | |

(Continued)

OTHER PUBLICATIONS

Zubin Dittia, "Integrated Hardware/Software Design of a High Performance Network Interface," Mar. 2000, Doctor of Science Thesis, Sever Institute of Technology, Washington University, St. Louis, Missouri, 139 pages.

(Continued)

*Primary Examiner*—Chi Pham
*Assistant Examiner*—Melanie Jagannathan
(74) *Attorney, Agent, or Firm*—The Law Office of Kirk D. Williams

(57) ABSTRACT

Methods and apparatuses are disclosed for pacing the rate at which packets of one or more information streams are sent from a device, such as, for example, a workstation, computer, communications mechanism, or component thereof. Typically, multiple timing wheels each having a different timing granularity are used to schedule the transmission of packets of information corresponding the to the information streams. Using multiple timing wheels in this manner allows scheduling of a larger range of rates while typically using a significantly smaller amount of memory than a single timing wheel covering the same range of rates. An entry, corresponding to a next portion of an information stream to be sent from the device, is inserted into the timing wheels at a target time for sending the information. At the target time, the entry is removed and placed in a transmit list of items to be sent from the device. In one implementation a single transmit list is used for all timing wheels. In another implementation, multiple transmit lists are used, typically one for each timing wheel. Entries corresponding to portions of the information streams to be sent from the device are removed in a queued or target transmission time order from a transmit list. A packet of information corresponding to a removed entry is sent, and the entry itself is re-inserted in a timing wheel for the determined next transmission target time.

26 Claims, 13 Drawing Sheets

U.S. PATENT DOCUMENTS

| | | |
|---|---|---|
| 5,127,000 A | 6/1992 | Henrion |
| 5,161,156 A | 11/1992 | Baum et al. |
| 5,173,897 A | 12/1992 | Schrodi et al. |
| 5,179,551 A | 1/1993 | Turner |
| 5,179,556 A | 1/1993 | Turner |
| 5,229,990 A | 7/1993 | Teraslinna |
| 5,229,991 A | 7/1993 | Turner |
| 5,253,251 A | 10/1993 | Aramaki |
| 5,260,935 A | 11/1993 | Turner |
| 5,265,092 A | 11/1993 | Soloway et al. |
| 5,339,311 A | 8/1994 | Turner |
| 5,402,415 A | 3/1995 | Turner |
| 5,471,460 A | 11/1995 | Tanabe |
| 5,475,682 A | 12/1995 | Choudhury et al. |
| 5,533,020 A * | 7/1996 | Byrn et al. .............. 370/395.4 |
| 5,689,500 A | 11/1997 | Chiussi et al. |
| 5,768,572 A * | 6/1998 | George et al. .............. 713/502 |
| 5,842,040 A | 11/1998 | Hughes et al. |
| 5,844,890 A * | 12/1998 | Delp et al. ................. 370/230 |
| 5,848,227 A | 12/1998 | Sheu |
| 6,246,665 B1 | 6/2001 | Watanabe et al. |
| 6,343,067 B1 | 1/2002 | Drottar et al. |
| 6,366,557 B1 | 4/2002 | Hunter |
| 6,411,599 B1 | 6/2002 | Blanc et al. |
| 6,418,115 B1 | 7/2002 | Lino et al. |
| 6,424,624 B1 | 7/2002 | Galand et al. |
| 6,430,150 B1 | 8/2002 | Azuma et al. |
| 6,477,168 B1 * | 11/2002 | Delp et al. ............... 370/395.4 |
| 6,654,342 B1 | 11/2003 | Dittia et al. |
| 6,674,721 B1 | 1/2004 | Dittia et al. |
| 6,728,211 B1 | 4/2004 | Peris et al. |
| 6,735,173 B1 | 5/2004 | Lenoski et al. |
| 6,747,972 B1 | 6/2004 | Lenoski et al. |
| 6,788,689 B1 | 9/2004 | Turner et al. |
| 6,816,492 B1 | 11/2004 | Turner et al. |
| 6,826,186 B1 | 11/2004 | Dittia et al. |

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

George Varghese and Anthony Lauck, "Hashed and Hierarchical Timing Wheels: Efficient Data Structures for Implementing a Timer Facility", IEEE/ACM Transactions on Networking, vol. 5, No. 6, Dec. 1997, pp. 824-834.

U.S. Appl. No. 09/705,450, filed Nov. 2, 2000, Turner et al.
U.S. Appl. No. 09/784,787, filed Feb. 15, 2001, Turner et al.
U.S. Appl. No. 09/519,282, filed Mar. 7, 2000, Lenoski et al.
U.S. Appl. No. 09/949,125, filed Sep. 7, 2001, Dejanovic et al.

* cited by examiner

METHOD AND APPARATUS FOR PACING THE FLOW OF INFORMATION SENT FROM A DEVICE

FIELD OF THE INVENTION

This invention relates to communications systems; more particularly, the invention relates to pacing the flow of information sent from a device.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

As used herein, the term "packet" refers to packets of all types, including, but not limited to, fixed length cells and variable length packets. Moreover, these packets may contain one or more types of information, including, but not limited to, voice, data, video, and audio information. The term "system" is used generically herein to describe any number of devices, computers, components, packet switch elements, packet switches, networks, computer and/or communication devices or mechanisms, or combinations thereof. The term "computer" is used generically herein to describe any number of computers, including, but not limited to personal computers, embedded processors, workstations, mainframes, etc. The term "device" is used generically herein to describe any type of mechanism, including a computer or system or component thereof (e.g., network interface card, etc.) which is directly or indirectly connected to a network, other devices, or components of the original or other device.

Many devices communicate with other devices and may want to "pace" or send traffic corresponding to one or more streams of information at a predetermined rate, which may correspond to a predetermined time interval between sending packets or groups of packets comprising a stream of information. For example, a computer connected to an asynchronous transfer mode ("ATM") network may want to pace the rate it sends information into the network. The desired pacing rate of each information stream may be static or dynamic, and may be determined based on one or more of several factors including, but not limited to, the type of traffic, the amount of bandwidth available, a communication service employed, the tariff or cost structure for sending information through the network, and numerous other technical and/or business reasons.

Networked devices, such as a computer or workstation connected to a private or public network (which may or may not include packet switching systems), use various techniques for pacing the flow of packets of information from these networked devices. However, known prior approaches for pacing one or more streams of information have drawbacks. Some of these prior approaches require a large amount of memory and/or induce jitter or drift into the transmission of packets of information over time.

SUMMARY OF THE INVENTION

A device paces the rate it sends information to a network or other device using multiple timing wheels. An entry corresponding to a portion of the information is placed in one of the multiple timing wheels. At the appropriate time, the entry is removed from the multiple timing wheels and the information corresponding to the entry is sent from the device.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
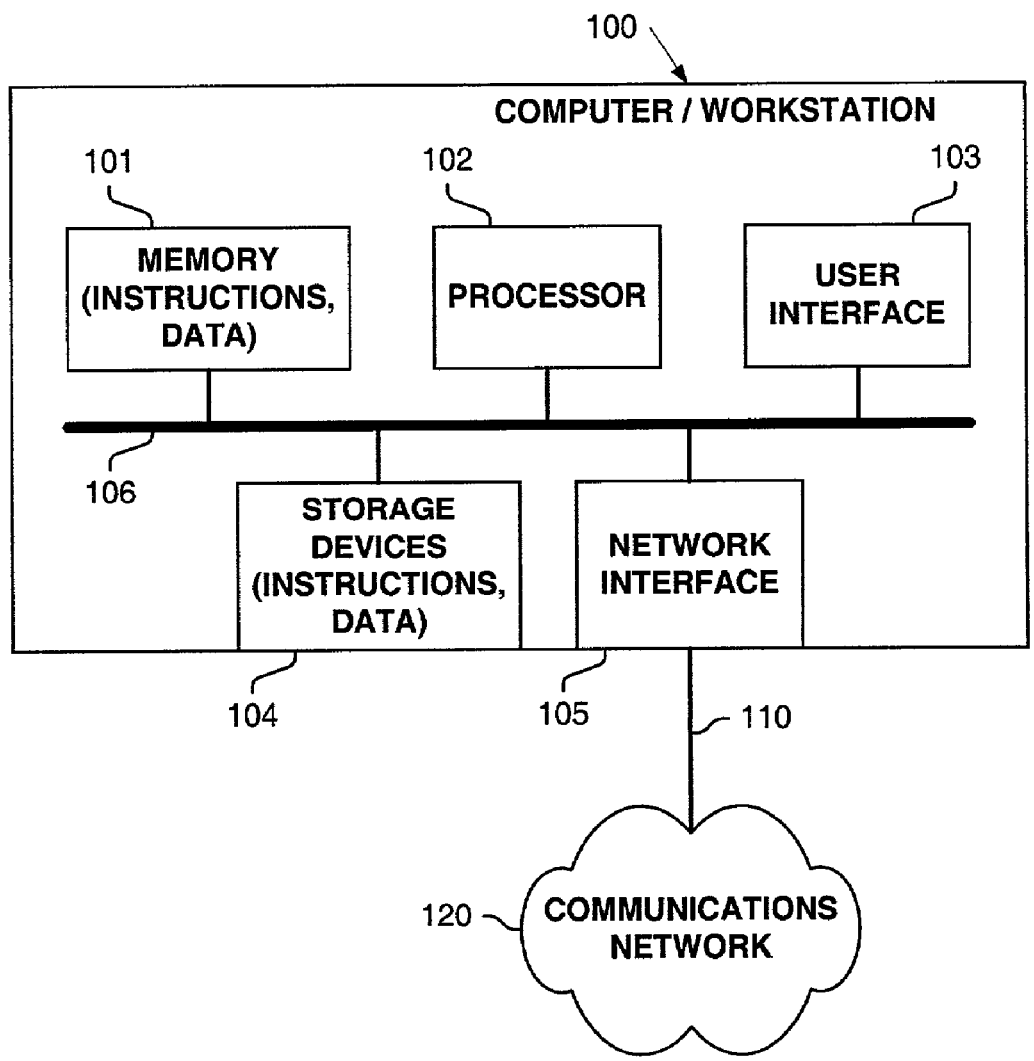
FIGS. 1A–B are a block diagrams of two of many possible embodiments of a device.

Methods and apparatuses are disclosed for controlling the rate at which packets are sent from a device. In one embodiment, the device represents a network interface card of a computer or workstation. Such methods and apparatus are not limited to a single networked device or packet switching environment. Rather, the architecture and functionality taught herein are extensible to an unlimited number of devices, systems, packet switching environments, and embodiments in keeping with the scope and spirit of the invention. Some embodiments described may include, inter alia, systems, integrated circuit chips, methods, and computer-readable media containing instructions.

A device is described that transmits one or more streams of information at one or more paced rates. In one embodiment, there is one rate-controlled virtual output queue for each stream of information. Some embodiments further include a rate assignment mechanism that determines what rates should be assigned to each of the rate-controlled virtual output queues. These rate-controlled virtual output queues also include a mechanism for adjusting the rates at which packets are sent out of the device. These rate-controlled virtual output queues may be configured via control or set-up messages at configuration time, dynamically or statically configured based on information received from another source (e.g., another component, external source, etc.), or may include a mechanism for automatically determining and adjusting their sending rates (e.g., based on received flow control information). Additionally, in some embodiments, the pacing rate may be adjusted to accommodate packets of varying lengths.

In one embodiment, each information stream to be transmitted has an output queue. An information stream scheduler determines when packets are sent from each queue. At any point in time, a queue for stream j is assigned a rate P(j) and the information stream scheduler causes packets to be sent at approximately the assigned rate.

Let $T(j)=1/P(j)$ be the target time interval between successive packets sent from stream j. T(j) is typically, but not always, expressed in time units equal to the time it takes the device to send a packet to a network.

In one embodiment, the information stream scheduler includes a data structure that comprises a set of "timing wheels." A timing wheel can be implemented as a one-dimensional array of linked lists. Each list contains a set of information stream identifiers. The position of a list in the array is used to determine when the information streams in the list should next send a packet from the device for the corresponding information stream. In the simplest case, a single timing wheel is used, while other embodiments employ multiple timing wheels having varying degrees of timing granularity. Using such multiple timing wheels typically allows the coverage of a wider time range using significantly less memory and/or simpler data structures. In one embodiment, indicators of information streams are stored in the timing wheel data structure until their scheduled time. At this time, the indicators are removed from the timing wheel data structure and placed in a transmit list. Items are removed from the transmit list and a packet corresponding to the information stream is sent, with an indicator for the information stream re-inserted into the timing wheel data structure in an appropriate time bin. In one embodiment, the item is only re-inserted if packets remain to be sent for the particular information stream.

The time bin into which an information stream identifier is inserted is selected to produce the desired rate of transmission for that information stream. For each information stream, there is a parameter T(j) referred to as the inter-packet time for that information stream. This parameter gives the average number of packet times between successive packet transmissions from the information stream. To enable accurate rate specifications, the inter-packet time may be expressed in time units that are smaller than the time it takes to transmit a single packet. When an information stream identifier is re-inserted into a time bin, a target transmission time is computed for the next packet to be sent from that information stream. This target transmission time is equal to T(j) plus the target transmission time of the previous packet sent from the information stream. The information stream identifier is re-inserted into that time bin whose contents will be transferred to the transmit list at the time that is closest to the target transmission time. Re-inserting the information stream identifier based on the last target time (rather than, for example, the time the most recent packet was sent, the time the information stream identifier was removed from the timing wheel, or the previous timing bin position of the information stream identifier) ensures that the long term transmission rate for each stream is correct, even though the time between successive packet transmissions may vary.

In one embodiment, each timing wheel also has a cursor which points to one of the lists in the array. The cursors are advanced from one position in the array to the next position in the array as time advances. The cursor for the first timing wheel is advanced at every time step (a time step typically being the time it takes the device to send a packet). The cursor for the second timing wheel is advanced less frequently, the cursor for the third timing wheel is advanced still less frequently, and so forth. Other embodiments may employ other timing data structures, timing and/or throttling mechanisms, which may include counters, timers, state machines, timestamps, etc.

In addition to the timing wheels, the information stream scheduler also contains a transmit list containing identifiers for information streams from which packets should be sent as soon as possible. During each time step, if the transmit list is not empty, the first information stream identifier in the transmit list is removed from the transmit list, a packet is sent from the device from that information stream, and if there are still more packets in the information stream that are waiting to be transmitted, then the information stream identifier is re-entered into the information stream scheduler.

In one embodiment, the scheduling of an information stream is accomplished as follows. The queue for traffic for stream j is scheduled by placing an information stream identifier in one of the lists in one of the timing wheels. Which list it goes into is determined using T(j) the allowed time interval between successive packet transmissions. In particular, a target time is determined for when the next packet should be sent, which is the sum of T(j) and the target time (not the actual time although this could be used which typically results in a less accurate pacing rate) for the last packet sent. If the target time for the next packet is x, then an information stream identifier is placed into a list that is associated with time x.

A single timing wheel is used in one embodiment. In another embodiment, multiple timing wheels are used. Using multiple timing wheels having different time periods allows the scheduling of a wider range of time values using a reduced amount of memory, while maintaining a fine level of granularity in one of the timing wheels.

One embodiment using multiple timing wheels is now described. Let N(k) be the number of lists in the k-th timing wheel and let C(k) be the cursor advance period for timing wheel k; this parameter specifies how frequently the cursor for timing wheel k is advanced from one list to the next. The range R(k) of a timing wheel k can be determined by the following formula: $R(k)=C(k)*N(k)$.

To schedule an information stream for a destination j, we first determine the target transmission time, x for the information stream.

If $x-(\text{current time}) \leq R(1)$, then we add the information stream identifier to the list of information stream identifiers in the first timing wheel that is (x/C(1)) positions past the current cursor position for the first timing wheel.

Else if $x-(\text{current time}) \leq R(2)$ then we add the information stream identifier to the list of information stream identifiers in the second timing wheel that is (x/C(2)) positions past the current cursor position for the second timing wheel.

Else if $x-(\text{current time}) \leq R(3)$ then we add the information stream identifier to the list of information stream identifiers in the third timing wheel that is (x/C(3)) positions past the current cursor position for the third timing wheel, and so on.

Whenever a cursor for a timing wheel is advanced, the list at the current cursor position is transferred to the end of the transmit list.

By using more timing wheels, a larger range of rates can be covered with the same amount of memory in the information stream scheduler.

FIG. 1 and its discussion herein are intended to provide a description of a general computing and/or networked environment in which the present invention can be practiced. The present invention is not limited to a single device or networked environment. The architecture and functionality of the present invention as taught herein and would be understood by one skilled in the art is extensible to an unlimited number of devices (including standalone devices and embedded components of other devices, etc.) and embodiments in keeping with the scope and spirit of the present invention. Moreover, the present invention provides for various methods, computer-readable medium containing computer-executable instructions, and apparatus for pacing the flow of information from a device.

Turning now to FIG. 1A, illustrated is an exemplary operating environment and embodiment of the present invention. Illustrated are device 100 and communications network 120. In an embodiment of the present invention, multiple information streams are sent at various paced rates from device 100 (e.g., a computer or workstation) to network 120 (e.g., an ATM network, the Internet, etc.)

Device 100 typically comprises a standard computer platform or a specialized computer platform, including, but not limited to a desktop computer, a laptop computer, personal data assistant, and a handheld computer. Device 100 could also be a component of a larger device, with device 100 having some or all of the illustrated elements 101–105. In one embodiment, device 100 comprises a processor 102, memory 101, storage devices 104, a network interface 105, and a user interface component 103 (e.g., interface(s) to a monitor, keyboard, mouse, etc.), which are electrically coupled via one or more communications mechanisms 106 (shown as a bus for illustrative purposes). Network interface 105 is connected to a communications network 120 (e.g., one or more networks, including, but not limited to the Internet, private or public telephone, cellular, wireless, satellite, cable, local area, metropolitan area and/or wide area networks) over connection 110. Memory 101 is one type of computer-readable medium, and typically comprises random access memory (RAM), read only memory (ROM), integrated circuits, and/or other memory components. Memory 101 typically stores computer-executable instructions to be executed by processor 102 and/or data which is manipulated by processor 102 for implementing functionality in accordance with the present invention. Storage devices 104 are another type of computer-readable medium, and typically comprise disk drives, diskettes, networked services, tape drives, and other storage devices. Storage devices 104 typically store computer-executable instructions to be executed by processor 102 and/or data which is manipulated by processor 102 for implementing functionality in accordance with the present invention. Additionally, device 100 and communications network 120 could be implemented as part of a single computer platform, with communications network 120 being an internal information sharing mechanism such as message passing or shared memory.

As used herein and contemplated by the present invention, computer-readable medium is an extensible term including memory and storage devices and other storage mechanisms.

Figure 1B:
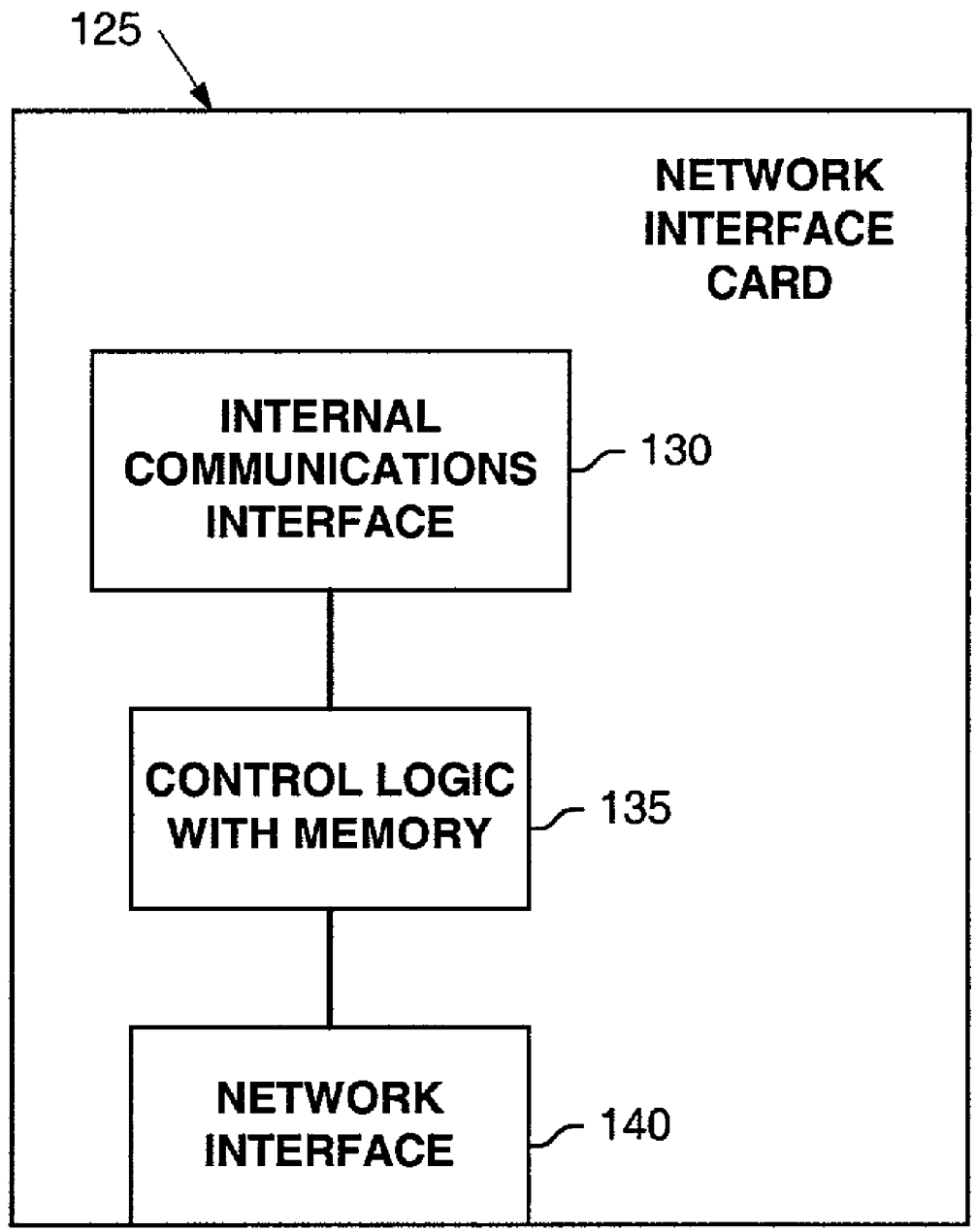

FIG. 1B illustrates a network interface card 125 that provides for pacing the flow of one or more information streams from network interface card 125. Network interface card 125 is typically a component of another device, such as computer or workstation 100 (FIG. 1A). However, computer or workstation 100 may pace the flow of one or more information streams with or without some or all of the pacing functionality located in network interface 105 (FIG. 1).

Although network interface card 125 is a "device" within itself, network interface card 125 is typically a component of a larger device such as a computer or workstation and thus includes an internal communications mechanism 130 which is used to receive the information streams from other sources, such as a process or device including, but not limited to, a video camera, disk, telephone, etc. Control logic with memory 135 receives these information streams and paces the rate at which these one or more streams of information are sent out of network interface 140.

Figure 2A:
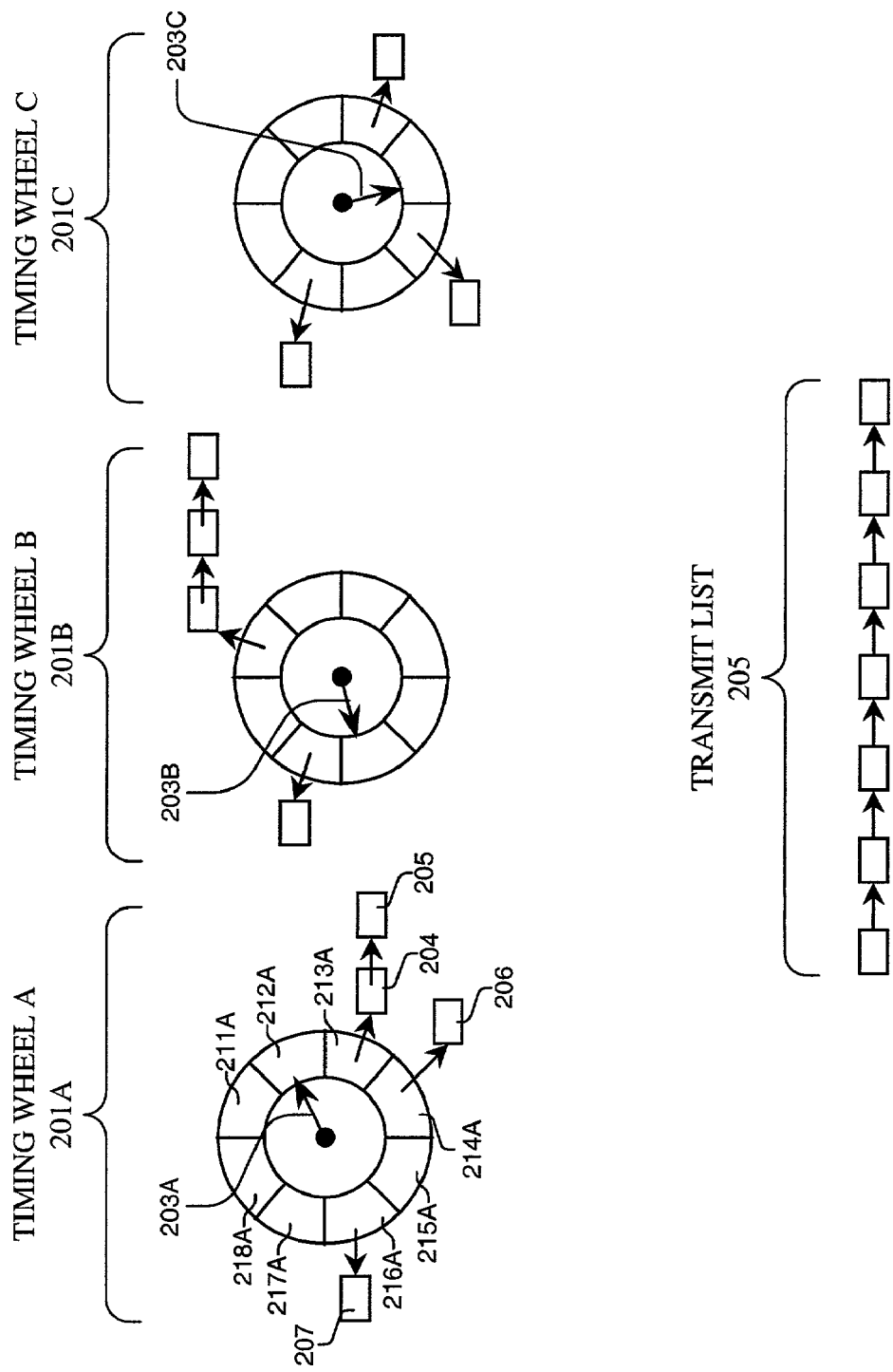
FIG. 2A is a block diagram of an exemplary set of timing wheels.

FIG. 2A illustrates one timing data structure which includes three timing wheels: timing wheel A 201A, timing wheel B 201B, and timing wheel C 201C. Other embodiments might use more or fewer timing wheels. Timing wheel A 201A has a finer timing granularity than timing wheel B 201B, which in turn has a finer timing granularity than 201C. Using multiple timing wheels in this manner allows scheduling of a larger range of rates while typically using a significantly smaller amount of memory than a single timing wheel covering the same range of rates. Timing wheels A, B, and C 201A–C have corresponding time cursors 203A–C that indicate the current time position with their respective timing wheel.

For illustrative purposes, timing wheel A is described in further detail, with this description also applying to timing wheels B and C 201B–C. Timing wheel A 201A has multiple timing bins 211A–218A which contain entries 204–207. (Only eight timing bins are shown for ease of illustration.) Timing bins 211A and 213A–218A correspond to future times to send the entries contained within the respective bin. Timing bin 212A, as indicated by cursor 203A, corresponds to the current time.

To schedule sending information from an information stream, the target transmission time x for the next portion of information, such as a packet, is determined.

If x−(current time)≦(range of timing wheel A 201A), then an information stream entry is added to one of the timing bins 211A–218A of timing wheel A 201 that is (x−current time)/(the cursor advance period of timing wheel A 201A) positions past the current position of cursor 203A.

Else if x−(current time)≦(range of timing wheel B 201B), then an information stream entry is added to one of the timing bins of timing wheel B 201B that is (x−current time)/(the cursor advance period of timing wheel B 201B) positions past the current position of cursor 203B.

Else an information stream entry is added to one of the timing bins of timing wheel C 201C that is (x−current time)/(the cursor advance period of timing wheel C 201C) positions past the current position of cursor 203C. Typically, the timing wheel of an embodiment having the coarsest granularity is sized to accommodate the largest desired time between sending packets of an information stream. If an entry's determined position exceeds the range of the largest timing wheel, then the entry could be handled in numerous ways, including placing the entry in the last bin relative to the cursor position or invoking some error handling routine.

Whenever a cursor for a timing wheel is advanced, the list at the current cursor position is transferred to the end of the transmit list 205. The operation of a single timing wheel is described further with reference to FIG. 2B.

In one embodiment, three timing wheels are used with each timing wheel having 256 timing bins with bin sizes of 1, 16, and 256 packet times. Thus, the first timing wheel is used to schedule a packet to be sent in the next 256 packet times, the second timing wheel is used to schedule a packet to be sent in the next 257 to 4096 packet times, and the third timing wheel is used to schedule a packet to be sent in the next 4097 to 65K packet times. It is possible to also reduce processing time for maintaining the timing wheels and sending information by coordinating the advancing of the cursors of the multiple timing bins, and slightly adjusting the advancing of the cursors. For example, the second timing wheel may be advanced +/− one packet time of the target time, and allowing a delay in the advancement of the cursor of the first timing wheel. If this delay of the first timing wheel is tracked, then empty timing bins can be skipped to move the first timing wheel's cursor to the correct position. A similar procedure can be used for the third timing wheel (such as advancing +/− four packet times), and so on for other timing wheels.

Figure 2B:
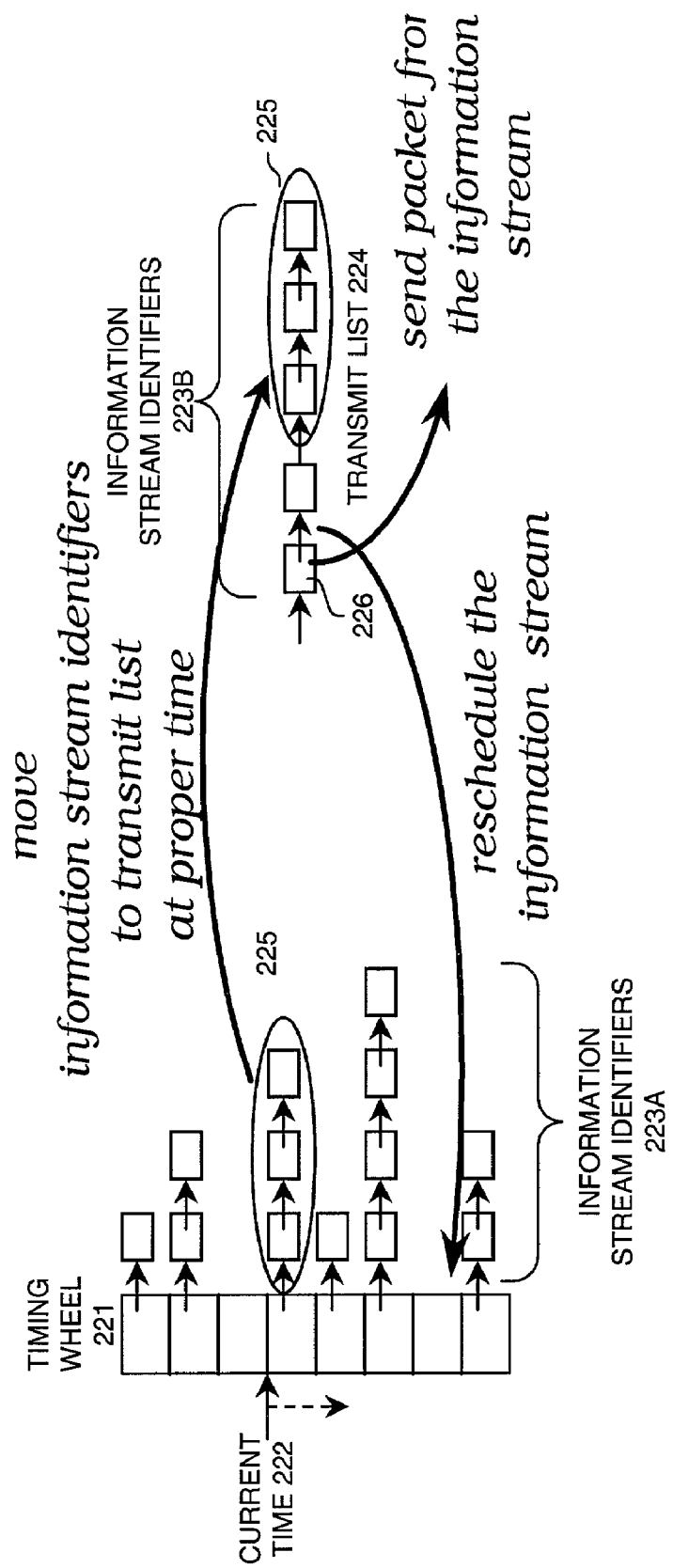
FIG. 2B is an annotated block diagram illustrating the scheduling operation of one embodiment.

FIG. 2B illustrates a single timing wheel which may be implemented using the components described in FIGS. 3, 4A–B, and 5A–D (described hereinafter). A timing wheel 221 is maintained with the current time indicated by cursor 222. A transmit list 224 is also maintained to indicate information streams currently allowed to have a packet sent, and in which order. In the illustrated embodiment, timing wheel 221 and transmit list 224 both use linked list data structures and include information stream identifier elements 223A and 223B (which may be in the form of information stream identifier data structure 500 illustrated in FIG. 5A).

At the current time indicated by cursor 222, information stream identifier elements 225 are moved from timing wheel 221 to the tail of transmit list 224. In parallel, the information stream identifier element 226 at the head of transmit list 224 is removed and a corresponding packet, stored in a packet queue (not shown) is sent from the corresponding information stream. The information stream identifier element 226 is then rescheduled (optionally after making sure there are more packets to be sent in the information stream) and placed in timing wheel 221 at an appropriate place corresponding to a next time to send the next packet for that information stream.

Figure 3:
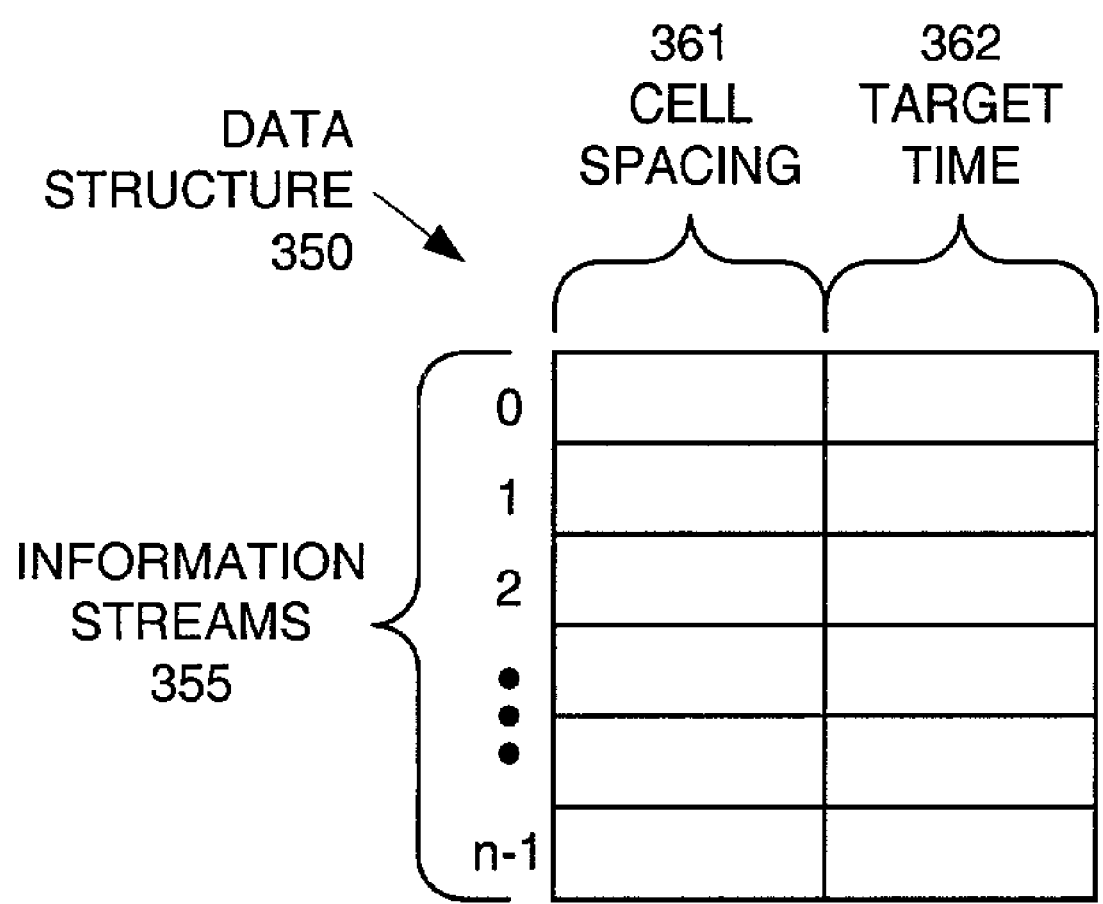
FIG. 3 illustrates a data structure which may be used to maintain cell spacing and target time information for each of the information streams.
Figure 4A:
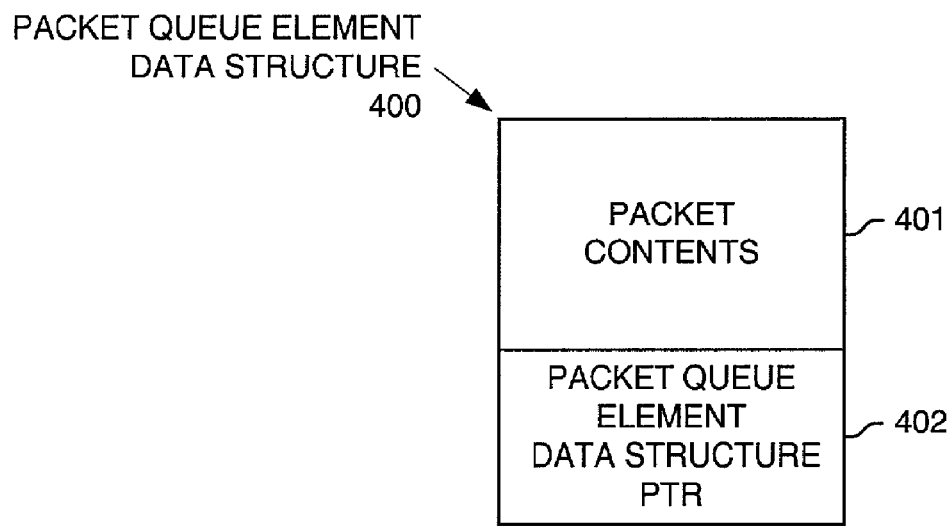
FIGS. 4A–B are block diagrams illustrating a data element and data structure which may be used to maintain a queue for information to be sent from the device.
Figure 4B:
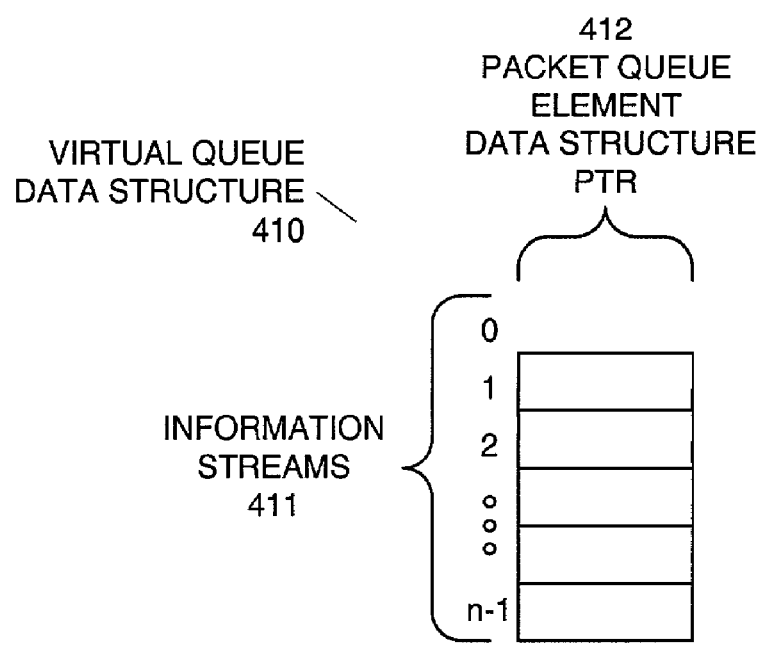

FIG. 3 illustrates a data structure 350 which may be used to determine the next target time for sending information corresponding to an information stream. Data structure 350 is an array having an index for each of the information streams 350. For each information stream, a packet spacing value 361 is maintained which indicates an ideal time between sending packets which corresponds to the target pacing rate. A target time value 362 is maintained for each information stream 355 which indicates a current target time for sending a packet of the information stream 355. A next target time 362 can be determined by adding the packet spacing value 361 to the current target time 362. By allowing packet spacing 361 and target time 362 to include fractional portions of a time unit (e.g., a packet time), and not just integers, the pacing rate for an information stream 355 becomes more accurate over time. This allows the system to send packets at rates that closely approximate the desired pacing rates. In other embodiments, the timing mechanism may omit the use of fractional portions in order to simplify the implementation, at the cost of reduced accuracy in the achieved packet transmission rates In one embodiment, a virtual packet queue is maintained for each information stream which the device is to send. As information arrives or is generated for an information stream, this information is placed in a corresponding virtual packet queue, and subsequently retrieved and sent at an appropriate time. FIGS. 4A–B illustrate an embodiment of such a packet queue. FIG. 4A illustrates a packet queue element data structure 400 comprising the packet contents 401, and a linked-list packet queue element data structure pointer 402. Virtual queue data structure 410 (FIG. 4B) implements the queues for each of the n information streams 411 by populating the corresponding packet queue element data structure pointer element 412 with a link-list pointer to one or more packet queue element data structures 400.

When a packet is allowed to be sent for an information stream, an indicator of the information stream (or the packet itself, or an indicator of a virtual output queue, etc.) is placed at the tail of a transmit list. These indicators are removed from the transmit list in order, with the packets corresponding to the respective information streams being sent. If packets remain to be sent, a removed indicator is re-inserted in a timing wheel.

These indicators are re-inserted into the scheduling data structure at a point that will result in packets being sent from each information stream at the desired pacing rate. This is typically accomplished by computing a target transmission time for each information stream, such as in the manner described herein in relation to data structure 350 illustrated in FIG. 3. An indicator is then re-inserted into the scheduling data structure using this computed target transmission time. Successive values of the target transmission time differ from one another by the inter-packet time for the information stream. The inter-packet time is the reciprocal of the desired pacing rate for the information stream. Alternative embodiments are possible which do not involve the calculation of a target transmission time. Such alternative embodiments are slightly simpler to implement, but the resulting packet transmission rates may differ significantly from the desired pacing rates.

Figure 5A:
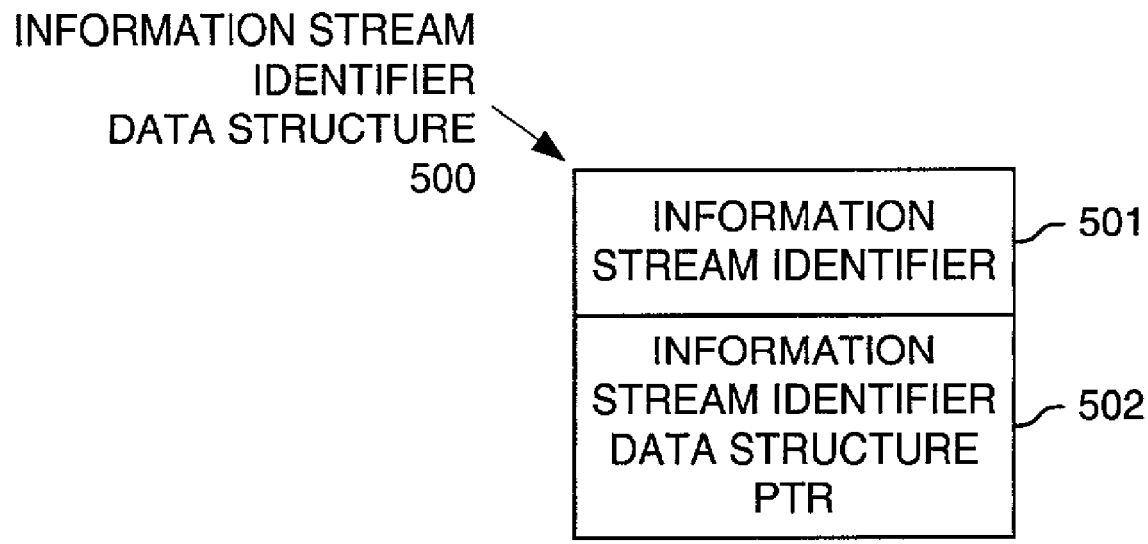
FIGS. 5A–D are block diagrams illustrating a data element and data structure which may be used to schedule packets to be sent from a device.
Figure 5B:
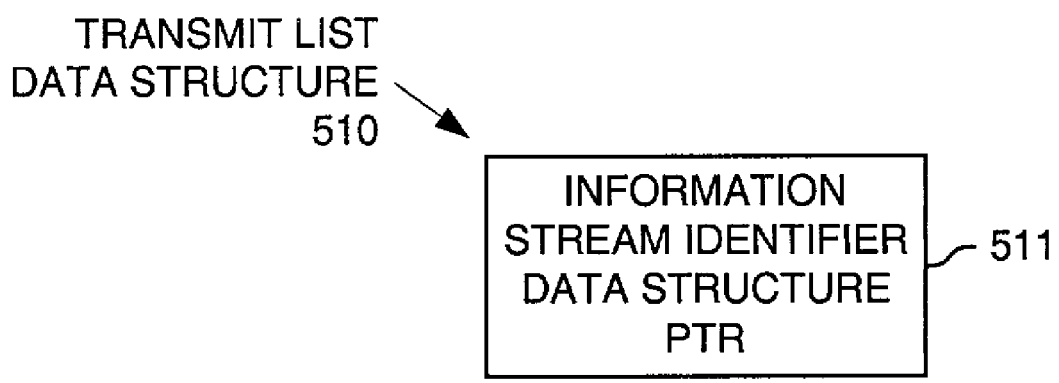

FIGS. 5A–B illustrate an embodiment using a linked-list to implement a transmit list. FIG. 5A illustrates an information stream identifier data structure 500 which includes an information stream identifier field 501 indicating to which information stream the identifier corresponds, and an information stream identifier data structure pointer field 502 for linking additional information stream identifier data structures 500. The transmit list may be then implemented using a transmit queue data structure 510 (FIG. 5B) having information stream identifier data structure pointer 511 which points to zero or more information stream identifier data structure elements 500.

Once the new target time has been determined, an indicator, such as information stream identifier data structure 500, is then placed into a timing wheel in the bin or slot that is closest to the new target time. This will cause the next packet for the corresponding input-output pair to be sent at close to the correct time. This method/mechanism allows coarse timing wheels, such as those having a granularity of one or multiple packet times, to be used, as the error induced by the timing data structure does not affect scheduling of future packets. Because the successive target times for a queue differ by its inter-packet time, packets are sent out at the desired rate on average, although there may be a significant time variation from packet to packet.

Figure 5C:
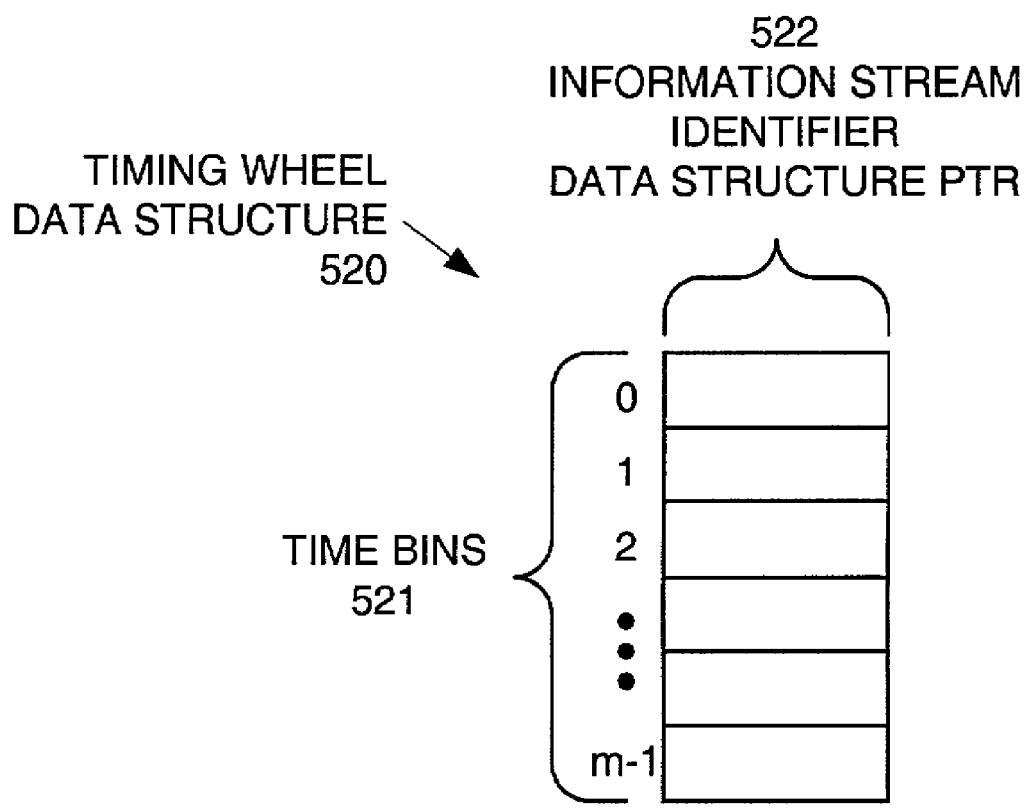
Figure 5D:
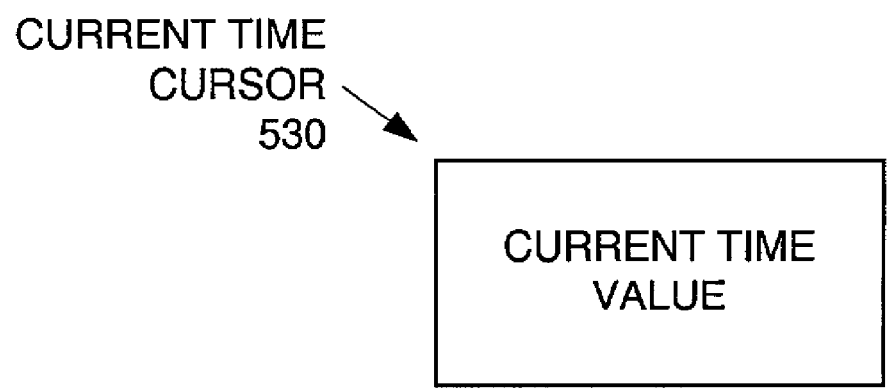

FIGS. 5C–D illustrate an embodiment of a timing wheel implemented using a linked-list data structure. FIG. 5C illustrates a timing wheel data structure 520 having m timing bins 521. An information stream identifier data structure pointer 522, which may point to zero or more information stream identifier data structures 500 (FIG. 5A), is maintained for each timing bin 521. Additionally, a current time cursor 530 (FIG. 5D) is maintained to indicate the current timing bin 521. Current time cursor 530 is typically updated at regular, periodic intervals, such as every packet time or some multiple thereof.

Figure 6A:
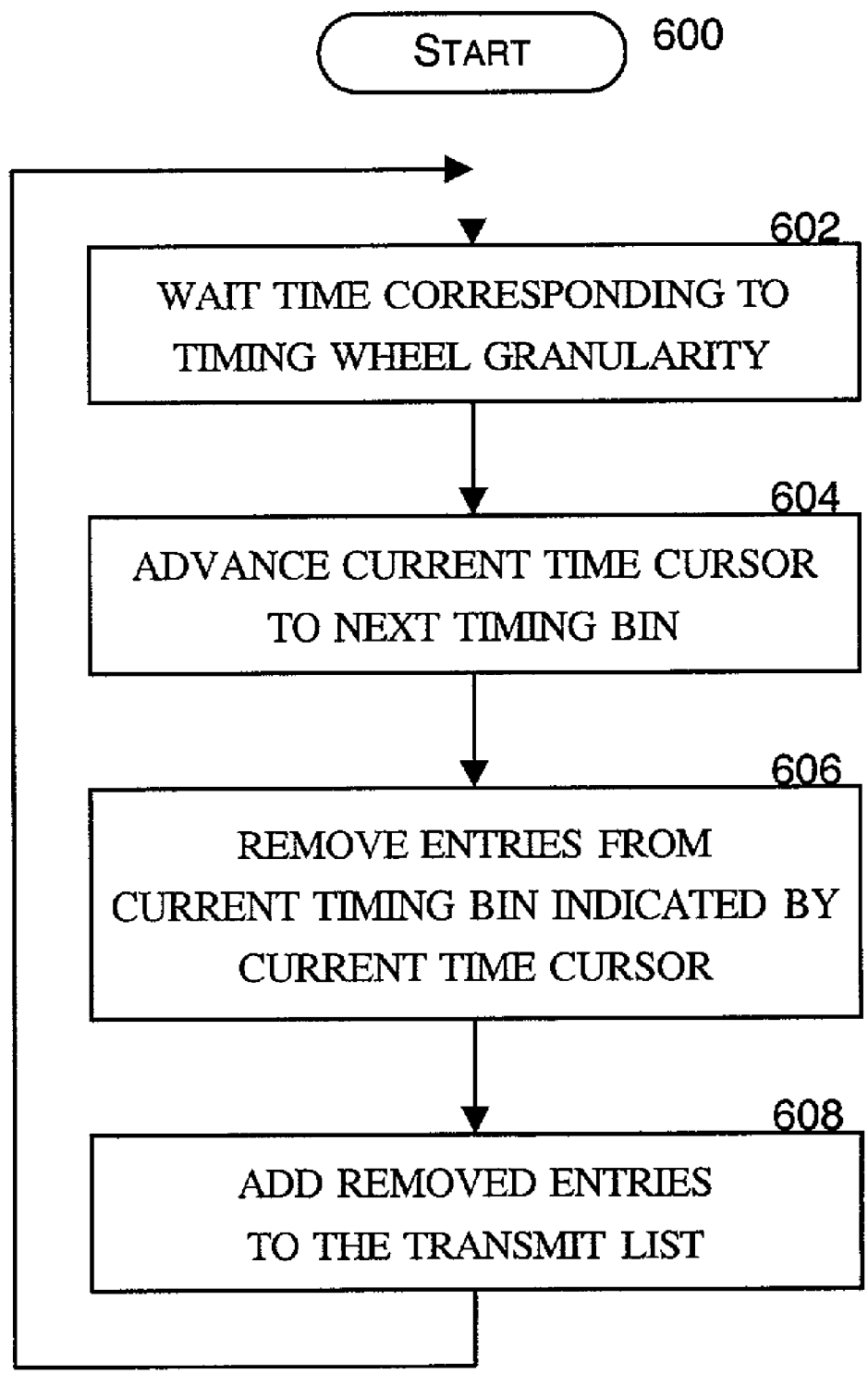
FIG. 6A is a flow diagram illustrating the process of removing an entry from a timing wheel and placing the entry in the transit list.

The operation of one embodiment of a timing wheel for pacing places entries (e.g., information stream identifiers) in a transmit list is illustrated in FIG. 6A. Processing begins at process block 600, and proceeds to process block 602 where the timing wheel waits the time corresponding to the timing granularity of the timing wheel. Next, in process block 604, the cursor for the timing wheel is advanced to the next timing bin. In process block 606 the entries are removed from the timing bin indicated by the current time cursor, with these removed entries being inserted into the transmit list in process block 608. Optionally, the removed entries could be sorted before being placed in the transmit list, and/or the entire transmit list could be maintained in a sorted order based on the target times of the respective information streams. Processing then returns to process block 602.

Figure 6B:
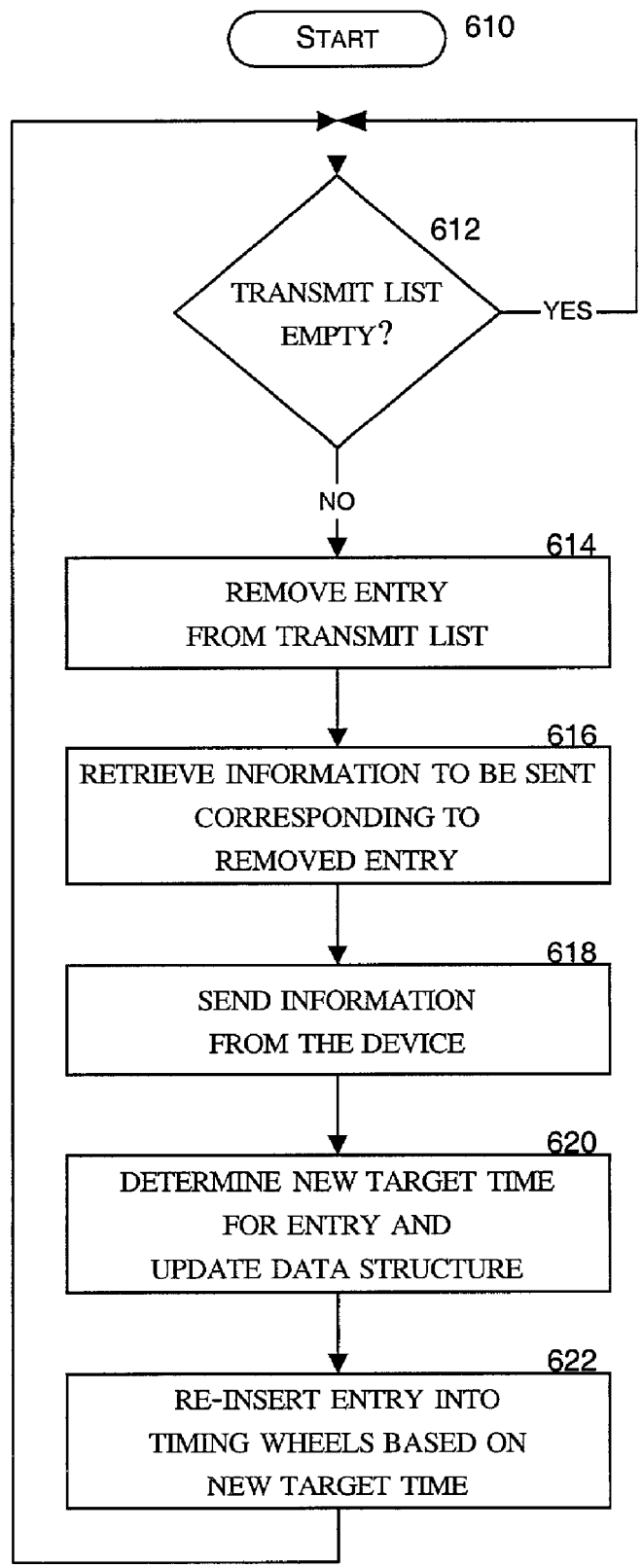
FIG. 6B is a flow diagram illustrating the process of removing an entry from the transmit list and sending the corresponding information from the device.

The operation of one embodiment for removing entries corresponding to one or more information streams from a transmit list and sending information from the device at appropriate pacing rate(s) is illustrated in FIG. 6B. Processing begins at process block 610, and proceeds to process block 612 which waits until the transmit list is not empty. In process block 614, an entry is removed from the transmit list. Next, in process block 616, information such as a packet or information to be contained in a payload of a packet, etc. is removed from the queue corresponding to the information stream, and this information is then sent from the device in process block 618. Next, in process block 620, a new target time is determined for the entry and a data structure (e.g., data structure 350 of FIG. 3, etc.) is updated to reflect the new target time. In process block 622, the entry is re-inserted into the timing wheels based on the determined new target time, and processing returns to process block 612 to process more entries.

Figure 6C:
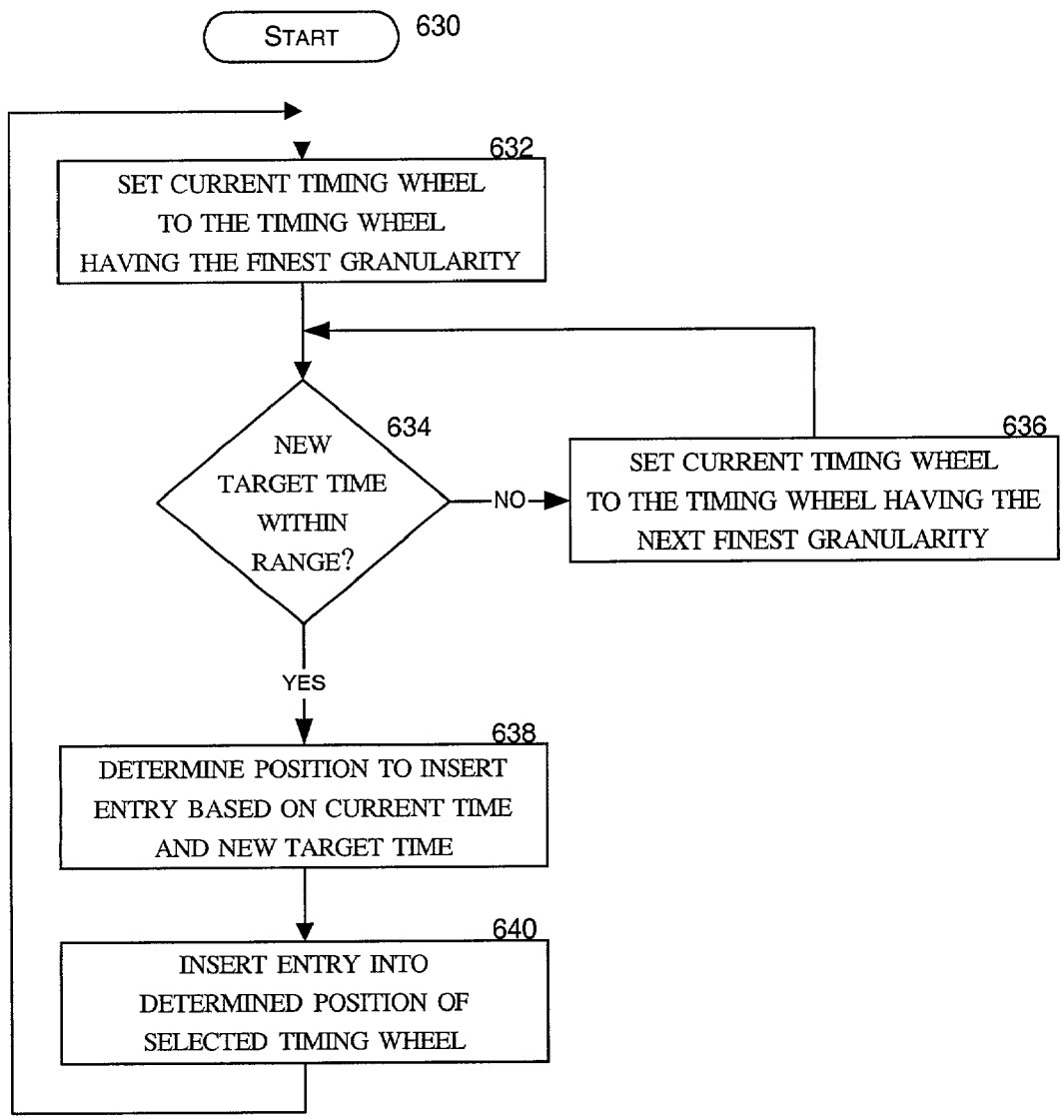
FIG. 6C is a flow diagram illustrating the process of inserting an entry in an appropriate one of the timing wheels.

The operation of one embodiment for inserting an entry (e.g., an information stream identifier) into one of multiple timing wheels is illustrated in FIG. 6C. Processing begins at process block 630, and proceeds to process block 632 where a current timing wheel indicator is set to the timing wheel having the finest timing granularity. Next, as determined in process block 634, if the target time for the entry is not within the range of the current timing wheel, then the current timing wheel is set in process block 636 to the next timing wheel having the next finest timing granularity, and processing returns to process block 634. Otherwise, in process block 638, the position to insert the entry into the current timing wheel is determined, and in process block 640, the entry is inserted into the timing wheel.

Figure 7A:
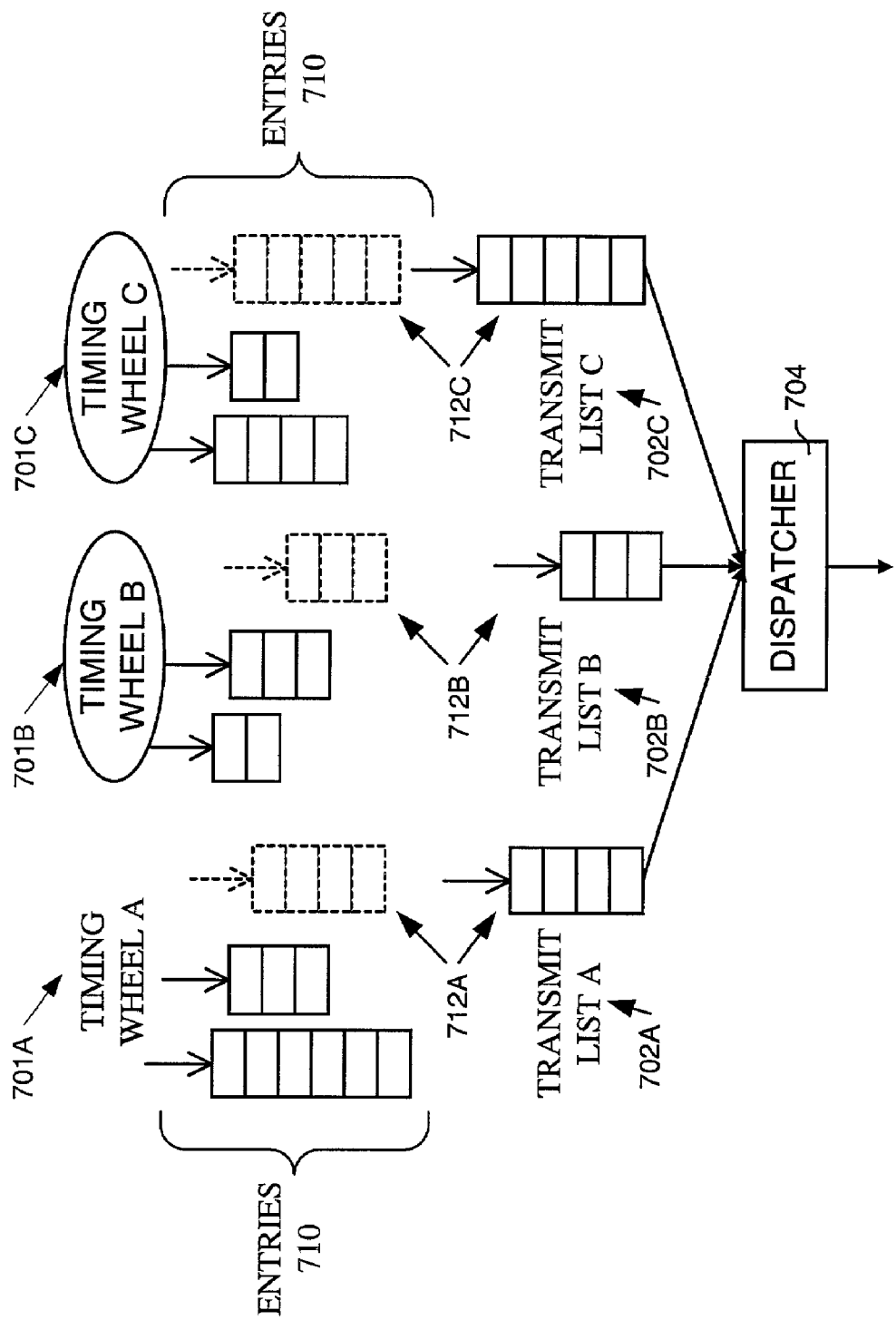
FIG. 7A is a block diagram of an exemplary embodiment using multiple transmit lists.

FIG. 7A illustrates another embodiment using multiple timing wheels, with three timing wheels being shown for simplicity of illustration. The embodiment of FIG. 7A operates very similar to that of the embodiment illustrated in FIG. 2A, with the exception that a transmit list 702A–C is maintained for each timing wheel 701A–C. Each timing wheel 701A–C maintains entries 710 as previously described herein. When entries are removed from timing wheels 701A–C, they are placed in transmit lists 702A–C, respectively, as denoted in the illustration by moving groups of entries 712A–C. A dispatcher 704 selectively removes entries from transmit lists 702A–C. In this manner, information to be sent based on an entry removed from one timing wheel can be given priority over that from another timing wheel. In certain embodiments, the entries stored in transmit lists 702A–C are sorted or removed in a sorted order.

Figure 7B:
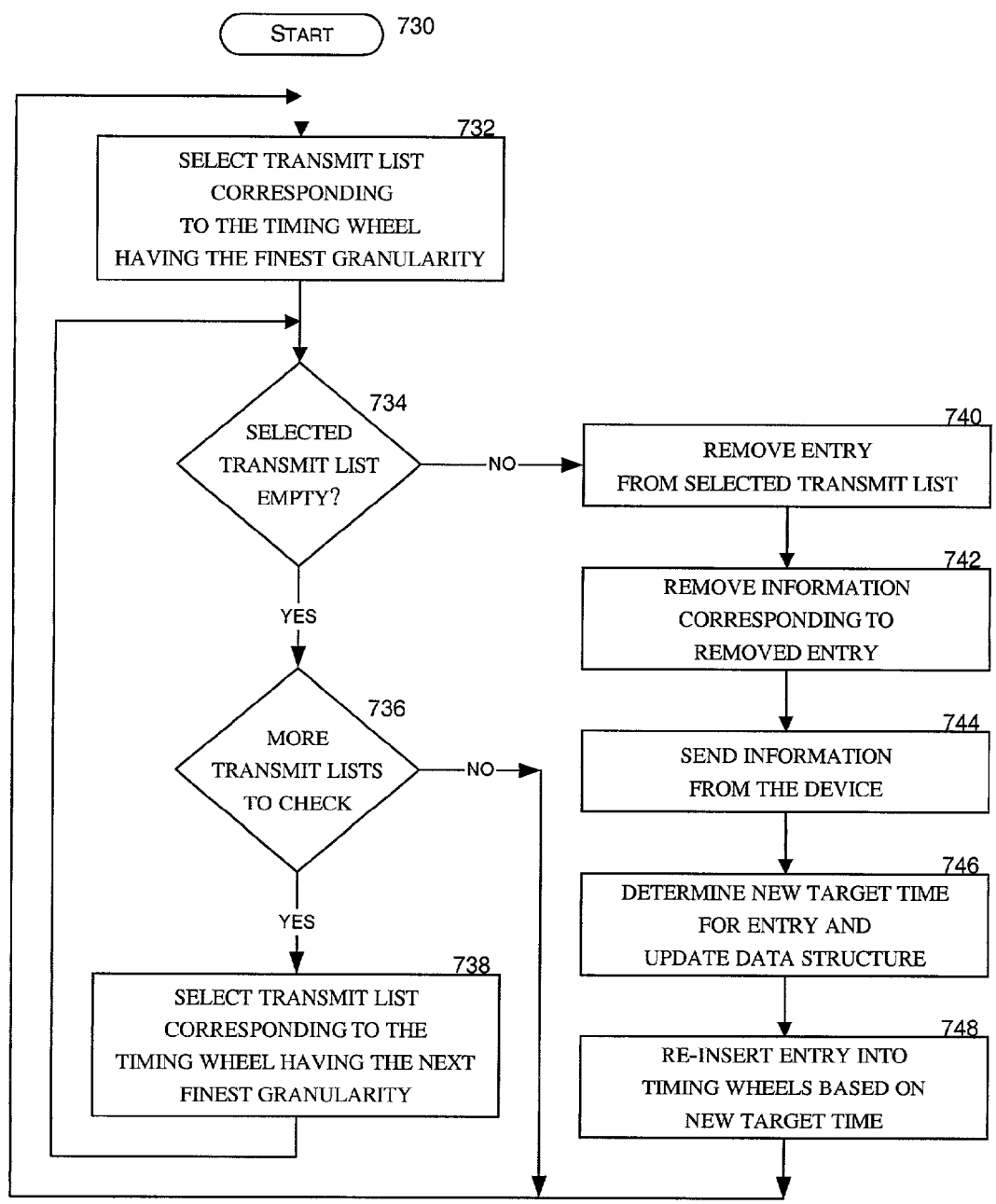
FIG. 7B is a flow diagram illustrating the process of removing an entry from one of the multiple transmit lists and sending the corresponding information from the device.

The operation of one embodiment of a scheduling mechanism having multiple timing wheels and transmit lists is illustrated in FIG. 7B. Processing begins at process block 730, and proceeds to process block 732 where the transmit list corresponding to the timing wheel with the finest timing granularity is selected. If the selected transmit list is empty as determined in process block 734, then if there are more transmit lists to check as determined in process block 736, then the transmit list having the next finest timing granularity is selected in process block 738 and processing returns to process block 734. Otherwise, processing returns to process block 732.

Otherwise, (i.e., when there are entries detected in the selected transmit list), an entry is removed from the selected transmit list in process block 740. This entry may correspond to the entry in the transmit list having the earliest target time or the entry at the head of the transmit list. Next, in process block 740, an entry is removed from the transmit list. Next, in process block 742 information, such as a packet or information to be contained in a payload of a packet, etc., is removed from the queue corresponding to the information stream, and this information is then sent from the device in process block 744. Next, in process block 746, a new target time is determined for the entry and a data structure (e.g., data structure 350 of FIG. 3, etc.) is updated to reflect the new target time. In process block 748, the entry is re-inserted into the timing wheels based on the determined new target time, and processing returns to process block 732 to process more entries.

For simplicity of understanding, some embodiments have been described herein using one type of data structures and/or elements. Typically, these data structures and elements have been described in the form of a linked list. As is apparent to one skilled in the art, numerous other embodiments are possible which use one or more of a wide variety of data structures and elements in keeping with the scope and spirit of the invention.

In the foregoing specification, the invention has been described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in a illustrative rather than a restrictive sense.

What is claimed is:

1. A method for pacing the flow of information from a device, the method comprising:
    inserting an entry into one of a plurality of timing wheels;
    removing the entry from said one of the plurality of timing wheels at an appropriate time corresponding to a position of the entry in the plurality of timing wheels;
    placing the entry into a transmit list in response to removing the entry from said one of the plurality of timing wheels, wherein the transmit list is not associated with a time slot within the plurality of timing wheels and entries currently in the transmit list, if any, are not currently associated with a time slot within the plurality of timing wheels, and the transmit list is configured for maintaining a plurality of entries removed from said timing wheels; and in response to identifying the entry is the next entry to process from the transmit list: removing the entry from the transmit list, sending information corresponding to the entry, determining a next target time, and re-inserting the entry removed from the transmit list into the plurality of timing wheels based on the next target time.

2. The method of claim 1, wherein the plurality of timing wheels include two timing wheels each having different time granularities.

3. The method of claim 1, wherein the next target time is determined from a last target time.

4. The method of claim 1, wherein the transmit list includes at least one other entry removed from a particular one the plurality of timing of timing wheels when said removing the entry from the transmit list is performed.

5. The method of claim 1, wherein each of the plurality of timing wheels are used to schedule information of a same priority level.

6. The method of claim 1, comprising selecting said one of the plurality of timing wheels, prior to said inserting the entry, based on said one of the plurality of timing wheels having the finest granularity of said wheels of the plurality of timing wheels and whose range includes the target time of the entry and regardless of a rate corresponding to the entry.

7. A method for pacing the flow of a plurality of streams of information from a device, the plurality of streams including a first stream having a corresponding first pacing rate identifier and a second stream having a corresponding second pacing rate identifier, the method comprising:
   maintaining a plurality of timing wheels;
   inserting the first pacing rate identifier into the plurality of timing wheels at a position corresponding to a first sending time to send a packet from the first stream;
   inserting the second pacing rate identifier into the plurality of timing wheels at a position corresponding to a second sending time to send a packet from the second stream;
   sequencing through the plurality of timing wheels at a plurality of predetermined rates wherein at approximately the first sending time removing the first pacing rate identifier from the plurality of timing wheels and inserting the first pacing rate identifier into a transmit list, with the transmit list not being associated with a time slot within the plurality of timing wheels, and the transmit list is configured for maintaining a plurality of identifiers removed from said timing wheels, and at approximately the second sending time removing the second pacing rate identifier from the plurality of timing wheels and inserting the second pacing rate identifier into the transmit list;
   in response to identifying that the first pacing rate identifier, added to the transmit list by said inserting the first pacing rate identifier into the transmit list operation, is the next identifier to process from the transmit list: removing the first pacing rate identifier from the transmit list, sending a packet from the first stream, and reinserting the first pacing rate identifier into the plurality of timing wheels; and
   in response to identifying that the second pacing rate identifier, added to the transmit list by said inserting the second pacing rate identifier into the transmit list operation, is the next identifier to process from the transmit list: removing the second pacing rate identifier from the transmit list, sending a packet from the second stream, and re-inserting the second pacing rate identifier into the plurality of timing wheels.

8. The method of claim 7, wherein the first pacing rate identifier is inserted into the transmit list before the second pacing rate identifier, the first and second pacing rate identifiers are in the transmit list at the same time, and the second pacing rate identifier is removed from the transmit list before the first pacing rate identifier.

9. The method of claim 7, wherein each of the plurality of timing wheels are used to schedule information of a same priority level.

10. A method for pacing the flow of a plurality of streams of information from a device, the plurality of streams including a first stream having a corresponding first pacing rate identifier and a second stream having a corresponding second pacing rate identifier, the method comprising:
    maintaining a plurality of timing wheels including a first timing wheel and a second timing wheel;
    maintaining a plurality of transmit lists including a first transmit list corresponding to the first timing wheel and a second transmit list corresponding to the second timing wheel, wherein said transmit lists are not associated with a time slot of their respective said timing wheels, and said transmit lists are each configured for maintaining a plurality of identifiers;
    inserting the first pacing rate identifier into the first timing wheel at a position corresponding to a first sending time to send a packet from the first stream:
    inserting the second pacing rate identifier into the second timing wheel at a position corresponding to a second sending time to send a packet from the second stream;
    sequencing through the plurality of timing wheels at a plurality of predetermined rates wherein at approximately the first sending time removing the first pacing rate identifier from the plurality of timing wheels and inserting the first pacing rate identifier into the first transmit list, and at approximately the second sending time removing the second pacing rate identifier from the plurality of timing wheels and inserting the second pacing rate identifier into the second transmit list;
    in response to identifying that the first pacing rate identifier, added to the first transmit list by said inserting the first pacing rate identifier into the first transmit list operation, is the next identifier to process from the first transmit list: removing the first pacing rate identifier from the first transmit list, sending a packet from the first stream, and re-inserting the first pacing rate identifier into the plurality of timing wheels; and
    in response to identifying that the second pacing rate identifier, added to the second transmit list by said inserting the second pacing rate identifier into the second transmit list operation, is the next identifier to process from the second transmit list: removing the second pacing rate identifier from the second transmit list, sending a packet from the second stream, and re-inserting the second pacing rate identifier into the plurality of timing wheels.

11. The method of claim 10, wherein the first timing wheel has a finer timing granularity than the second timing wheel, and wherein items are removed from the second transmit list only if the first transmit list is empty.

12. The method of claim 10, wherein each of the plurality of timing wheels are used to schedule information of a same priority level.

13. One or more computer-readable media containing computer-executable steps for pacing the flow of information from a device, said steps comprising:
  inserting an entry into one of a plurality of timing wheels;
  removing the entry from said one of the plurality of timing wheels at an appropriate time corresponding to a position of the entry in the plurality of timing wheels;
  placing the entry into a transmit list in response to removing the entry from said one of the plurality of timing wheels, wherein the transmit list is not associated with a time slot within the plurality of timing wheels, and the transmit list is configured for maintaining a plurality of entries removed from said timing wheels;
  in response to identifying the entry is the next entry to process from the transmit list: removing the entry from the transmit list; sending information corresponding to the entry, and determining a next target time and re-inserting the entry removed from the transmit list into the plurality of timing wheels based on the next target time.

14. The computer-readable media of claim 13, wherein the plurality of timing wheels include two timing wheels each having different time granularities.

15. The computer-readable media of claim 13, wherein the next target time is determined from a last target time.

16. The method of claim 13, wherein the transmit list includes at least one other entry removed from a particular one the plurality of timing of timing wheels when said removing the entry from the transmit list is performed.

17. The computer-readable medium of claim 13, wherein each of the plurality of timing wheels are used to schedule information of a same priority level.

18. The computer-readable medium of claim 13, wherein said steps include selecting said one of the plurality of timing wheels, prior to said inserting the entry, based on said one of the plurality of timing wheels having the finest granularity of said wheels of the plurality of timing wheels and whose range includes the target time of the entry and regardless of a rate corresponding to the entry.

19. An apparatus for pacing the flow of information from a device, said apparatus comprising:
  means for inserting an entry into one of a plurality of timing wheels;
  means for removing the entry from said one of the plurality of timing wheels at an appropriate time corresponding to a position of the entry in the plurality of timing wheels;
  means for placing the entry into a transmit list in response to removing the entry from said one of the plurality of timing wheels, wherein the transmit list is not associated with a time slot within the plurality of timing wheels, and the transmit list is configured for maintaining a plurality of entries removed from said timing wheels;
  means for in response to identifying the entry is the next entry to process from the transmit list: removing the entry from the transmit list, sending information corresponding to the entry in response to the entry being removed from the transmit list, and determining a next target time and re-inserting the entry removed from the transmit list into the plurality of timing wheels based on the next target time.

20. The apparatus of claim 19, wherein the plurality of timing wheels include two timing wheels each having different time granularities.

21. The apparatus of claim 19, wherein the next target time is determined from a last target time.

22. The apparatus of claim 19, wherein the transmit list includes at least one other entry removed from a particular one the plurality of timing of timing wheels when said removing the entry from the transmit list is performed.

23. The apparatus of claim 19, wherein each of the plurality of timing wheels are used to schedule information of a same priority level.

24. The apparatus of claim 19, including means for selecting said one of the plurality of timing wheels, prior to said inserting the entry, based on said one of the plurality of timing wheels having the finest granularity of said wheels of the plurality of timing wheels and whose range includes the target time of the entry and regardless of a rate corresponding to the entry.

25. An apparatus for pacing the flow of information from a device, said apparatus comprising:
  one or more timing wheels;
  one or more transmit lists;
  a timing wheel process configured to repeatedly advance through said timing wheels and at corresponding scheduled times and to remove entries from said timing wheels at their respective scheduled times and to add said removed entries to said transmit lists, wherein said transmit lists are not associated with a time slot within any of the plurality of timing wheels and said entries added to said transmit lists are not associated with a time slot of said timing wheels while awaiting processing by a transmit list process; and
  the transmit list process configured to, when said transmit lists are not empty: remove a next particular entry from said transmit lists, send information corresponding to the next particular entry, determining a next target time for the particular entry, and causing the next particular entry removed from said transmit lists to be re-inserted into said timing wheels based on the next target time.

26. The apparatus of claim 25, wherein each transmit list of said one or more transmit lists is configured to store a plurality of entries.

* * * * *

UNITED STATES PATENT AND TRADEMARK OFFICE
CERTIFICATE OF CORRECTION

| | | |
|---|---|---|
| PATENT NO. | : 7,106,693 B1 | Page 1 of 1 |
| APPLICATION NO. | : 09/705395 | |
| DATED | : September 12, 2006 | |
| INVENTOR(S) | : Turner et al. | |

It is certified that error appears in the above-identified patent and that said Letters Patent is hereby corrected as shown below:

Col. 13, line 27, Claim 16, replace "The method of claim 13" with -- The computer readable media of claim 13 --

Signed and Sealed this

Twenty-third Day of March, 2010

David J. Kappos
*Director of the United States Patent and Trademark Office*